US008625581B2

(12) United States Patent
Ku et al.

(10) Patent No.: US 8,625,581 B2
(45) Date of Patent: *Jan. 7, 2014

(54) METHODS AND APPARATUS FOR ENHANCING THE SCALABILITY OF IMS IN VOIP SERVICE DEPLOYMENT

(75) Inventors: Bernard Ku, Austin, TX (US); Armstrong Soo, San Ramon, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/526,757

(22) Filed: Jun. 19, 2012

(65) Prior Publication Data

US 2012/0314700 A1    Dec. 13, 2012

Related U.S. Application Data

(63) Continuation of application No. 12/433,452, filed on Apr. 30, 2009, now Pat. No. 8,249,077.

(51) Int. Cl.
*H04L 12/66* (2006.01)

(52) U.S. Cl.
USPC .......................................................... 370/352

(58) Field of Classification Search
USPC ............................ 370/352–356, 395.2–395.3
See application file for complete search history.

(56) References Cited

U.S. PATENT DOCUMENTS

| | | | |
|---|---|---|---|
| 7,031,747 B2 | 4/2006 | Cyr et al. |
| 7,042,841 B2 | 5/2006 | Abdelilah et al. |
| 8,059,656 B1 | 11/2011 | Telikepalli et al. |
| 2005/0141527 A1 | 6/2005 | Gateva et al. |
| 2006/0084454 A1 | 4/2006 | Sung et al. |
| 2006/0153102 A1 | 7/2006 | Kuure et al. |
| 2006/0280163 A1 | 12/2006 | Zhao et al. |
| 2007/0064709 A1 | 3/2007 | Holmstrom et al. |
| 2007/0091836 A1 | 4/2007 | Oprescu-Surcobe et al. |
| 2008/0123687 A1 | 5/2008 | Bangalore et al. |
| 2008/0198839 A1 | 8/2008 | Ku et al. |
| 2008/0311888 A1 | 12/2008 | Ku et al. |
| 2011/0231558 A1 | 9/2011 | Holm |

*Primary Examiner* — Otis L Thompson, Jr.
(74) *Attorney, Agent, or Firm* — Wolff & Samson, PC (57) ABSTRACT

Methods for Enhancing the Scalability of IMS in VoIP Service Deployment lower the number of messages transmitted between functions of an IMS network. The number of messages transmitted between functions of an IMS network are lowered by storing and utilizing predetermined configuration information pertaining to the calling and called parties including the media and codecs the parties support. The predetermined configuration information, which may be based on a prior peering business agreement, supports the implementation of a one round procedure for establishing an IMS communication session.

12 Claims, 6 Drawing Sheets

METHODS AND APPARATUS FOR ENHANCING THE SCALABILITY OF IMS IN VOIP SERVICE DEPLOYMENT

This application is a continuation of prior application Ser. No. 12/433,452 filed Apr. 30, 2009 which is incorporated herein by reference.

BACKGROUND OF THE INVENTION

The present invention relates generally to telecommunications, and more particularly to enhancing the scalability of an Internet Protocol (IP) Multimedia Subsystem (IMS) in Voice over IP (VoIP), Service over IP (SoIP), and the like, deployment.

IP Multimedia Subsystem (IMS), in theory, is a traffic-independent scalable architecture. Various Session Initiation Protocol (SIP) servers can be deployed dynamically to users and such servers are distributed such that the capacity is extensible. However, SIP is a text-based signaling protocol and has a large message size. In some instances, the SIP response message may exceed that allowed for User Datagram Protocol (UDP), which is typically the underlying protocol for layer 3 (i.e. the network layer of the Open Systems Interconnection (OSI) reference model), thereby causing the fragmentation of the response message. Due to the large message size combined with the typical large number of SIP nodes/servers in IMS, a large number of messages are produced and complicated message flows must be processed, all of which reduces the scalability of IMS in, for example, an enterprise/business VoIP deployment. In addition, it should be noted that the $3^{rd}$ Generation Partnership Project (3GPP) (standard TS-23.228 V8.8.0. (2009-03) IMS System Architecture) does not specify how Quality of Service (QoS) within IMS is realized.

Figure 2:
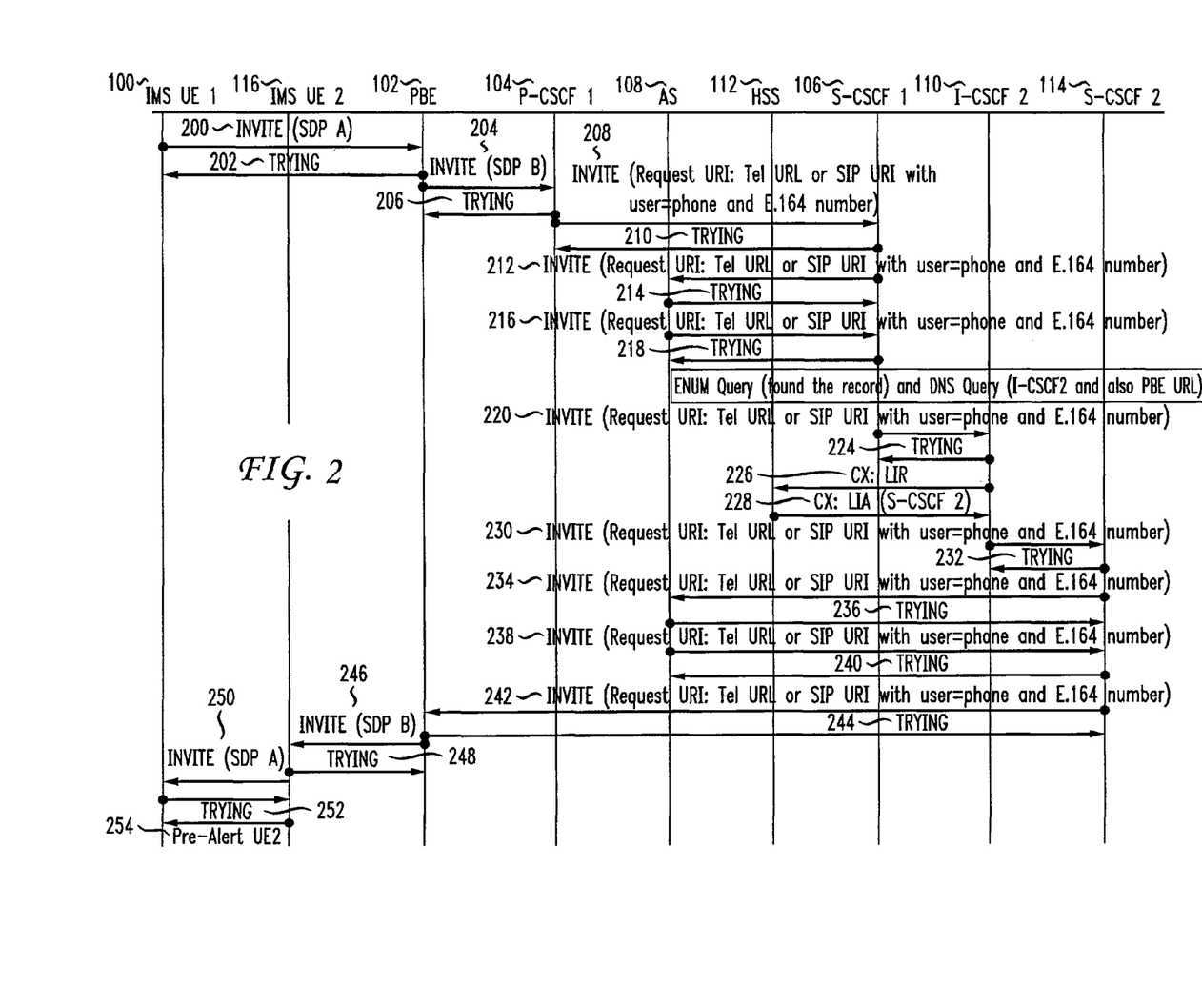
FIG. 2 shows a call flow diagram depicting the path finding round of the conventional two round procedure.
Figure 3:
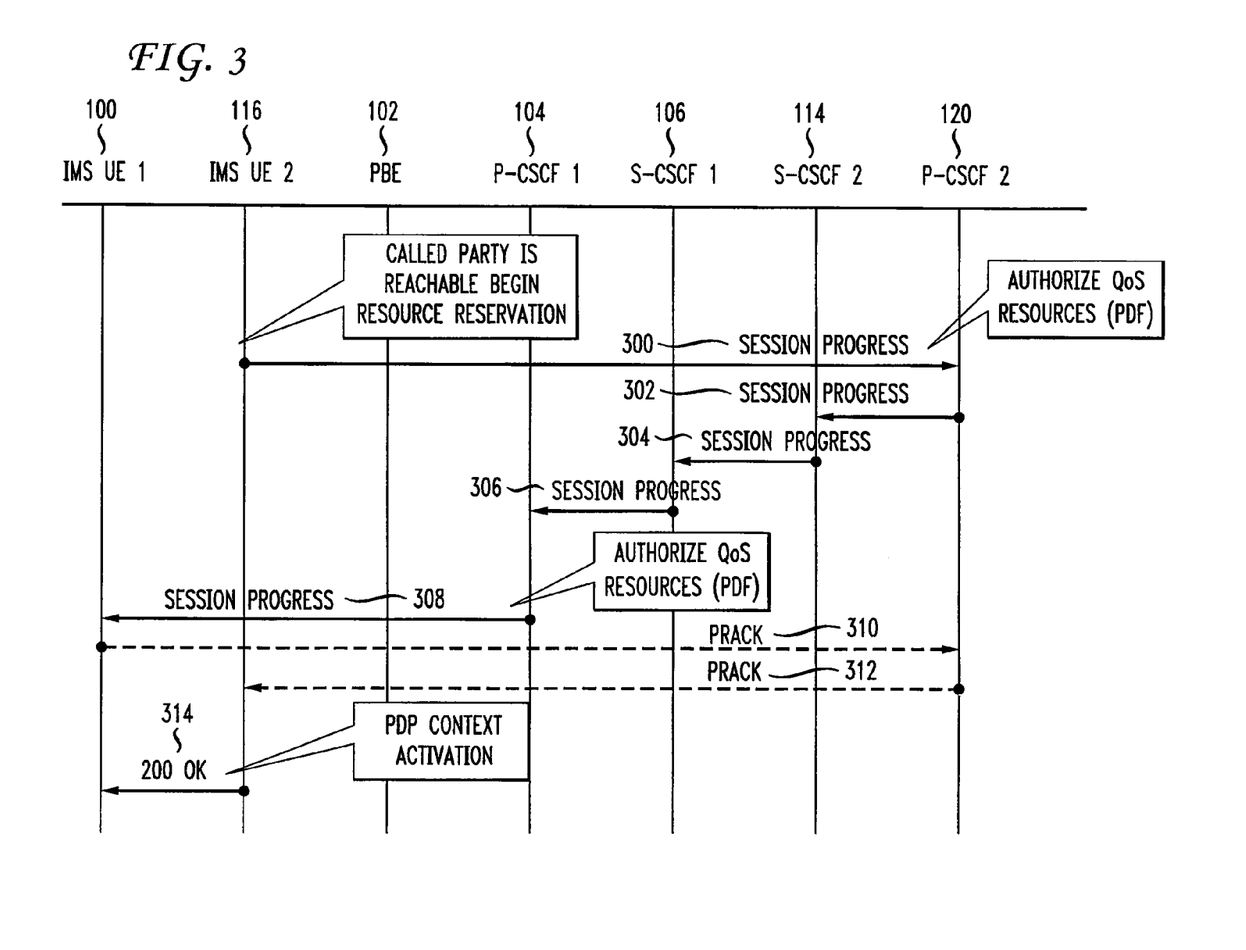
FIG. 3 shows a call flow diagram depicting the resource negotiation round of the conventional two round procedure.

Setting up a multimedia communication session in IMS conventionally involves a two round procedure as shown in FIGS. 2 and 3. In a first round, shown in FIG. 2, a signal path is determined from a calling party to a called party. In a second round, shown in FIG. 3, resources for supporting the communication are negotiated and reserved. As illustrated by FIGS. 2 and 3, each request to initiate a communications session requires multiple SIP messages to be transmitted. The number of messages transmitted as shown in FIGS. 2 and 3 multiplied by the number of communications sessions requested typically results in a large number of SIP messages transmitted which often results in messages being truncated and/or lost during transmission. What is needed is a way to initiate communications sessions with less signaling messages.

BRIEF SUMMARY OF THE INVENTION

The present invention provides a method and apparatus for establishing IMS communication sessions using a one round procedure.

One embodiment of the present invention is a method for establishing an Internet Protocol Multimedia Subsystem (IMS) communication session having a predetermined Quality of Service. A request to establish an IMS communications session between a calling and a called party is received. Resources are then allocated for the communication session based on predetermined configuration information related to the parties and a signal path between the parties is determined.

According to another embodiment of the present invention, resources associated with a called party are allocated in response to an indication that the called party accepts the request to establish the IMS communication session. According to another embodiment of the present invention, resources associated with a calling party network are allocated based on information contained in a request from the user equipment associated with the calling party.

These and other advantages of the invention will be apparent to those of ordinary skill in the art by reference to the following detailed description and the accompanying drawings.

DETAILED DESCRIPTION

Figure 1:
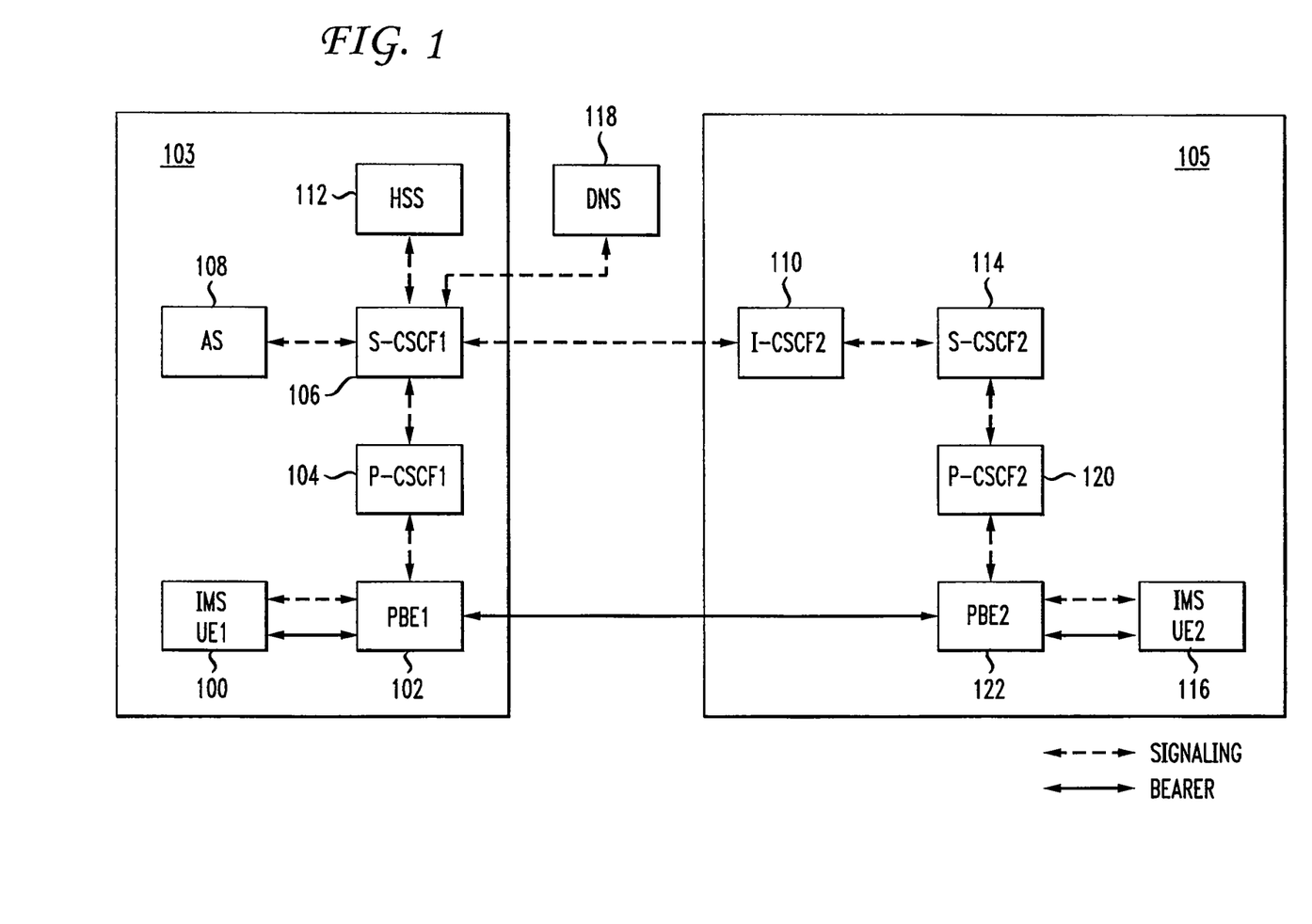
FIG. 1 shows a high level block diagram of the functions of a system for providing IP based Multimedia services according to one embodiment of the present invention.

FIG. 1 shows a high level block diagram of an IP Multimedia Subsystem (IMS) for providing IP based multimedia services. It should be noted that one or more functions may be run on a single implementer (i.e. specific hardware or a node) and that various embodiments may have one or more functions distributed across a number of implementers or nodes. Functions are conventionally linked by standardized interfaces which allow communication between the functions. Each of the functions of the system shown in FIG. 1 performs operations related to providing IP based multimedia services described as follows.

IMS UE1 100 and IMS UE2 116 are IP Multimedia Subsystem User Equipment for the calling and called party, respectively. IMS User Equipment may comprise one or more of a variety of customer end point device (e.g. wireline or wireless phones, personal computers, laptop computers, Personal Digital Assistants (PDAs), etc.) IMS UE1 100 and IMS UE2 116 are each located in their respective IMS networks, referred to herein as the calling party network 103 and the called party network 105. IMS UE1 100 and IMS UE2 116 communicate with one another and other functions in the IMS networks via a Peering Border Element (PBE), such as PBE1 102 and PBE2 122.

PBE1 102 and PBE2 122 perform session border control and functions to control the one or more data streams related to a particular IMS communication session. PBE1 102 and PBE2 122 include functionality (e.g. security related functionality) to control the flow of data between an internal and an external network. PBE1 102 and PBE2 122 may each be, for example, a Session Border Control (SBC) which is used in some VoIP networks to exert control over the signaling and the media streams involved in setting up, conducting, and tearing down voice calls or other interactive media communications.

An IMS network includes multiple Session Initiation Protocol (SIP) Servers which are known as Call Session Control Functions (CSCFs). The CSCFs are used to process SIP signaling packets and perform different functions as described below.

A Proxy Call Session Control Function (P-CSCF) intercepts SIP INVITE messages and analyzes them to determine the desired called party and whether the messages contain logic requiring analysis by an Application Server (AS). The P-CSCF is usually a first point of contact for user equipment unless a Session Border Controller (SBC) such as PBE1 102 described above is used to implement some of the functionality of the P-CSCF. The P-CSCF may inspect every message from user equipment and may also authenticate and establish a security association with the user equipment to prevent spoofing and replay attacks. A P-CSCF may also employ a Policy Decision Function (PDF) that authorizes resources in a media plane. For example, the P-CSCF may employ a PDF pertaining to the quality of service over the media plane for policy control or bandwidth management. The calling party and called party networks typically each have their own P-CSCFs such as P-CSCF1 104 and P-CSCF2 120 shown in FIG. 1. P-CSCFs are typically in communication with user equipment, either directly or through a session border controller such as PBE1 102, other CSCFs, and Application Servers (AS) and may be in communication with other devices in the IMS network as well.

An Application Server (AS) hosts and executes various services such as caller ID, call waiting, push to talk, etc. An AS may interface with Serving Call Session Control Function (S-CSCF) using Session Initiation Protocol (SIP) to provide these services and the AS may operate in different modes depending on the service provided. The AS server may operate in SIP Proxy mode, SIP user agent mode, or SIP back to back user agent mode. An AS may be located in a home network, such as AS 108 shown in calling party network 103, or in an external third party network.

A Home Subscriber Server (HSS), such as HSS 112, is conventionally a master database that supports the IMS functions that actually handle communication sessions. An HSS contains information related to subscribers such as user profiles and performs authentication and authorization of a particular user.

The Server Call Session Control Function (S-CSCF) is the central node of an IMS network and is conventionally an SIP server. The S-CSCF performs session control functions and handles SIP registrations which relate user locations and SIP addresses. An S-CSCF can inspect every message and determine which application server or servers an SIP message should be forwarded to. The S-CSCF routes messages using tElephone NUMbering (ENUM) lookups. There may be multiple S-CSCFs in a network in order to distribute communication session loads and increase availability. As shown in FIG. 1, an S-CSCF 106 and S-CSCF 114 are located in the calling party network 103 and the called party network 105, respectively. An S-CSCF is in communication with various IMS functions including P-CSCFs, AS, HSS, and Interrogating-CSCFs (I-CSCFs) and may be in communication with other devices in the IMS network as well.

I-CSCF2 110 is shown in FIG. 1 located in called party network 105 and in communication with S-CSCF2 114. An I-CSCF is an SIP function that may be located at the edge of an administrative domain. An IP address of the I-CSCF may be maintained in a Domain Name System (DNS) of the administrative domain thereby allowing remote servers to locate a specific I-CSCF and use it as a forwarding point for SIP packets to the administrative domain. An I-CSCF may be in communication with a HSS in order to determine subscriber locations and then route SIP messages to the appropriate S-CSCF.

It should be noted that in FIG. 1, dashed lines indicate signaling channels and solid lines indicate bearer channels.

Initiation of a conventional IMS communication session between a calling party and a called party is briefly described in conjunction with FIG. 1 as follows. A communication session is initiated by a user via IMS UE1 100 and an invitation is transmitted to S-CSCF1 106 via PBE1 102 and P-CSCF1-104. S-CSCF1 106 accesses HSS 112 to retrieve a subscriber profile if necessary. S-CSCF1 106 also communicates with AS 108 in order to determine and apply service logic as necessary. Domain Name Server (DNS) 118 may be accessed by S-CSCF1 106 to retrieve the address of called party network 105 which allows the invitation to be transmitted from S-CSCF1 106 to I-CSCF2 110. I-CSCF2 110 determines the Registrar of the called party and subsequently transmits the invitation to S-CSCF2 114 which is associated with the called party. The called party's subscriber profile may be retrieved from an HSS (not shown for clarity) associated with the called party similar to the retrieval described above related to the calling party. An AS (also not shown for clarity) associated with the called party may also be accessed by S-CSCF2 114 to determine and apply any service logic as necessary. The invitation is then forwarded to IMS UE2 116 via P-CSCF2 120 and PBE2 122. Session Description Protocol (SDP) negotiation and resource reservation control then occur followed by ringing/alerting. Finally, in response to the called party answering the call, IMS UE1 100 and IMS UE2 116 are connected through PBE1 102, PBE2 122 and the bearer line connecting PBE1 102 and PBE2 122 as well as the bearer lines connecting IMS UE1 and IMS UE2 to their respective PBEs 102 and 122.

Each of the functions described above are well known to one of ordinary skill in the art and will not be described further herein except as necessary to describe various embodiments and implementations.

FIGS. 2 and 3 show a conventional two round procedure for establishing an IMS communication session. FIGS. 2 and 3 are described herein while referring to FIG. 1 to illustrate the conventional two round procedure for establishing an IMS communication session between IMS UE1 100 and IMS UE2 116. It should be noted that some of the functions shown in FIG. 1 have been omitted from FIGS. 2 and 3 (i.e. DNS 118, and PBE 2 122) for clarity. The omitted functions may be included in various implementations as required or desired.

In brief, the conventional two round procedure is effectuated as follows. As shown in FIG. 2, IMS UE1 100 initiates the signal flow after a calling party attempts to initiate a communication session. Signals transmitted between various functions determine the called party as well as functions associated with the called party such as S-CSCF2 114 and IMS UE2 116. After the called party is determined, the called party is alerted with a pre-alert indicating that the calling party would like to initiate a communication session. The pre-alert signal transmitted to the IMS UE2 116 can be considered the end of the signal path round as there is now at least one known signal path between IMS UE1 100 and IMS UE2 116. If the called party is available and willing to accept the call, the resource reservation round shown in FIG. 3 begins. It should be noted that at this point in the two round procedure, the numerous signals and messages transmitted between the functions shown in FIG. 2 only determine a signal path between the calling and called parties. Additional signals and messages must be transmitted to reserve the resources required for the communication session as shown in FIG. 3.

Described briefly, the resource reservation round of the conventional two round procedure shown in FIG. 3 begins after it has been determined that the called party is available and willing to begin a communication session with the calling party. IMS UE2 116 signals P-CSCF2 120 to reserve resources associated with the called party for the communication session. P-CSCF 2 120 signals PCSCF-1 104 through S-CSCF1 106 to reserve resources associated with the called party for the communication session. P-CSCF1 104 then signals IMS UE1 100 indicating that the resources for the call have been reserved. IMS UE1 100 signals P-CSCF2 120 indicating that the resources for the communication session are reserved and P-CSCF2 120, in turn, signals IMS UE2 116 indicating same. Finally, IMS UE2 116 signals IMS UE1 100 and the communication session commences.

FIG. 2 shows a call flow diagram (also referred to as a signaling diagram) depicting an implementation of the path finding round of a conventional two round procedure for establishing an IMS communication session. In the path finding procedure of FIG. 2, it should be noted that some steps may be eliminated, or additional steps added, depending on various configurations.

In response to a calling party attempting to initiate a communications session, IMS UE1 100 transmits an SIP INVITE message 200 containing a Session Description Protocol (SDP) message (SDP A) to PBE1 102. The SDP A message contains information such as the media content of the session and may also include other information such as what IP ports to use and information concerning codecs to be used.

In response to SIP INVITE message 200, PBE1 102 transmits an informational response 'Trying' message 202 to IMS UE 1 100 and transmits INVITE message 204 to P-CSCF 1 104. INVITE message 204 also contains an SDP message (SDP B) containing information originally contained in the SDP A message. It should be noted that the designation "A" of the SDP A message indicates that the SDP message is sent from IMS UE1 100 to PBE1 102 and the designation "B" of the SDP B message indicates that the SDP message is sent from PBE1 102 to P-SCSF1 104.

In response to INVITE message 204, P-CSCF1 104 transmits INVITE message 208 to S-CSCF1 106 which responds with Trying message 210. INVITE message 208 includes Request URI: Tel URL or SIP URI with user=phone and E.164 number, the Request URI containing a Public User Identity of the intended destination.

In response to INVITE message 208, S-CSCF1 106 transmits an INVITE message 212 to AS 108 which, in response transmits Trying message 214 to S-CSCF1 106. Also in response to INVITE message 208, AS 108 transmits INVITE message 216 to S-CSCF1 106. INVITE message 216 includes Request URI: Tel URL or SIP URI with user=phone and E.164 number, the Request URI containing a Public User Identity of the intended destination.

In response to INVITE message 216, S-CSCF1 transmits Trying message 218 to AS 108. S-CSCF1 106 also transmits INVITE message 220 to I-CSCF2 110 which, in response, transmits Trying message 224 to S-CSCF1 106. In response to INVITE message 220, I-CSCF2 110 also transmits CX: LIR Message 226 to HSS 112 in order to determine the address of the S-CSCF allocated to the called party. In response to CX: LIR message 226, HSS 112 transmits CX:LIA (S-CSCF 2) message 228 to I-CSCF2 110. In response to CX:LIA (S-CSCF2) message 228, I-CSCF2 transmits INVITE message 230 to S-CSCF2 114 which, in response, transmits trying message 232 to I-CSCF2 110. Also in response to INVITE message 230, S-CSCF2 114 transmits INVITE message 234 to AS 108 which, in response, transmits Trying message 236 to S-CSCF2 110.

Also in response to INVITE message 234, AS 108 transmits INVITE message 238 to S-CSCF2 114 which, in response, transmits trying message 240 to AS 108. Also in response to INVITE message 238, S-CSCF2 114 transmits INVITE message 242 to P-CSCF1 104, which, in response, transmits trying message 244 to S-CSCF2 114. Also in response to INVITE message 242, P-CSCF1 104 transmits INVITE message 246 to PBE1 102. INVITE message 246 transmitted to PBE1102 contains SDP B information and in response to message 246, PBE1 102 transmits trying message 248 to P-CSCF1 104. PBE1 102 also transmits INVITE message 250 containing SDP A information to IMS UE2 116 in response to INVITE message 246. In response to INVITE message 250, IMS UE2 116 transmits trying message 252. PBE1 102 then sends Pre-Alert UE2 message 254 to IMS UE2 116.

If the called party, in this case the party associated with IMS UE2 116, is available, then the process of resource reservation to support the communication session occurs. FIG. 3 is a signaling diagram showing the resource reservation round of the conventional two round procedure that occurs after the path finding round shown in FIG. 2 is completed. IMS UE2 116 transmits session progress message 300 to P-CSCF2 120 which indicates to P-CSCF2 120 that the called party is available for the requested communication session and P-CSCF2 120 should allocate resources in the called party network for the session. P-CSCF2 120 also transmits session progress message 302 to S-CSCF2 114 which then transmits session progress message 304 to S-CSCF1 106 which, in turn, transmits session progress message 306 to P-CSCF1 104. P-CSCF1 104, in response, allocates resources in the calling party network for the communication session. P-CSCF1 104 then transmits session progress message 308 to IMS UE1 100 indicating that the resources for the communication session have been allocated. IMS UE1 then transmits PRACK (Provisional Response ACKnowledgement) message 310 to P-CSCF2 120 indicating that the resources for the communication session have been allocated.

PRACK message 310 is a provisional type response which is one of the two types of SIP responses, the other type being final. Final responses (designated as 2xx-6xx) convey the result of the requested processing and are sent reliably. Normal SIP provisional responses do not have an acknowledgement system and, as such, they are not reliable. This can create problems as there are certain scenarios in which the provisional SIP responses (designated as 1xx) must be delivered reliably. For example, in an SIP/PSTN inter-working scenario it is crucial that the 180 and 183 messages are not missed. The SIP PRACK method solves this problem by guaranteeing a reliable and ordered delivery of provisional responses in SIP.

In response to PRACK message 310 transmitted to P-CSCF2 120, PRACK message 312 is transmitted from P-CSCF2 120 to IMS UE2 116 indicating to IMS UE2 116 that the resources for the communication session have been allocated and the communication session can commence. 200 OK message 314 is sent from IMS UE2 116 to IMS UE1 100 in response to PRACK message 312 and indicates to IMS UE1 100 that the communication session can commence.

It should be noted that the transmission and receipt of PRACK messages ensure that adequate network resources (e.g. bandwidth) are available to support the requested communication session with the desired Quality of Service (QoS).

As described above, the conventional two round procedure to establish an IMS communication session requires that a large number of signaling messages be sent between various IMS functions. This is because the resource allocation round shown in FIG. 3 is performed after the signal path finding round shown in FIG. 2. According to an advantageous embodiment of the present invention, the amount of signaling required, and thus the number of messages sent, can be lowered using a one round procedure for establishing an IMS communication session which combines both the signal path finding round and the resource allocation round.

Figure 4A:
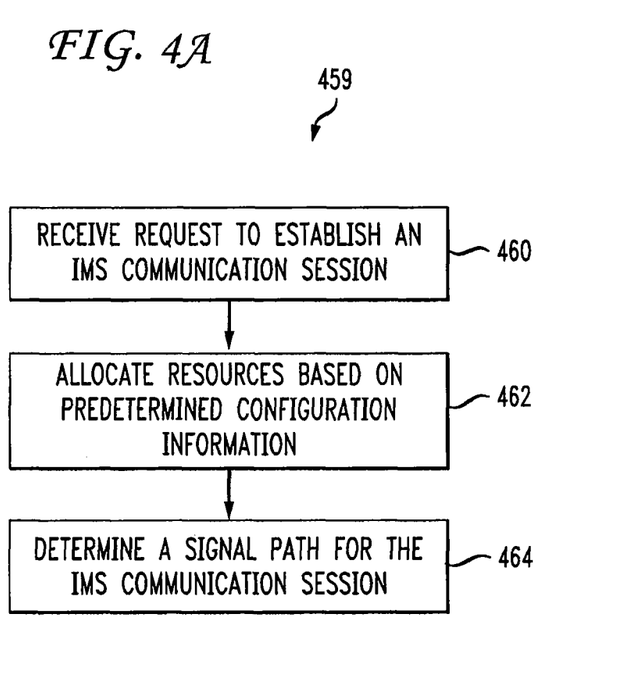
FIG. 4A shows a flow chart depicting a one round method for establishing an IP Multimedia Subsystem communication session according to an embodiment of the present invention.

FIG. 4A depicts flow chart 459 illustrating one embodiment of the present invention can be performed using the IMS shown in FIG. 1. It should be noted that the functions shown in FIG. 1 are modified as described below to facilitate the embodiment of the one round procedure shown in FIG. 4A. As shown in FIG. 4A, at step 460, a request to establish an IMS communication session is received. At step 462, resources for the communication session are allocated based on predetermined configuration information related to the calling and called parties.

The predetermined configuration information, in one embodiment, pertains to the codecs and media both the calling and called party support. The predetermined configuration information may also include other information such as a predetermined quality of service for the communication session. The predetermined configuration information, in one embodiment, is based on prior peering business agreements pertaining to the codec and media the calling and called parties support in addition to information pertaining to a predetermined quality of service for communication sessions between the calling and called party.

Peering is the exchange of IP traffic between two directly interconnected IP networks, including best available router arrangement, codec combination, etc. Throughout the history of the Internet, there have been a spectrum of kinds of agreements between peers, ranging from handshake deals to peering contracts which may be required by one or both sides. Such a contract sets forth the details of how traffic is to be exchanged, along with a list of expected activities which may be necessary to maintain the peering relationship, a list of activities which may be considered abusive and result in termination of the relationship, and details concerning how the relationship can be terminated. Detailed contracts of this type are typically used between the largest ISPs, and the ones operating in the most heavily-regulated economies, accounting for about 1-2% of peering relationships overall.

In one embodiment, the prior peering business agreements are stored on IMS UE1 100 and IMS UE2 116. In other embodiments, the prior peering business agreements may be stored and retrieved from an HSS or AS such as HSS 112 or AS 108 or other functions, implementers, or nodes.

In one embodiment, the predetermined configuration information may be transmitted by IMS UE1 100 and contained in an SDP A message included in SIP INVITE message. In one embodiment, IMS UE1 100 may allocate the resources for a communication session first and IMS UE2 116 follows the same path thereby eliminating the need for another round trip responsive message.

At step 464, a signal path for the IMS communication session is determined, after which the communications session between the calling and called party may commence.

It should be noted that IMS UE1 100 and IMS UE2 116 used with the conventional two round procedure are normally programmed so that UE1 determines the codec used and responds to UE2. In one embodiment, in order to facilitate the one round procedure, IMS UE1 is configured to not send a response back to IMS UE2. In addition, IMS UE2 is configured to not expect confirmation from IMS UE1.

Figure 4B:
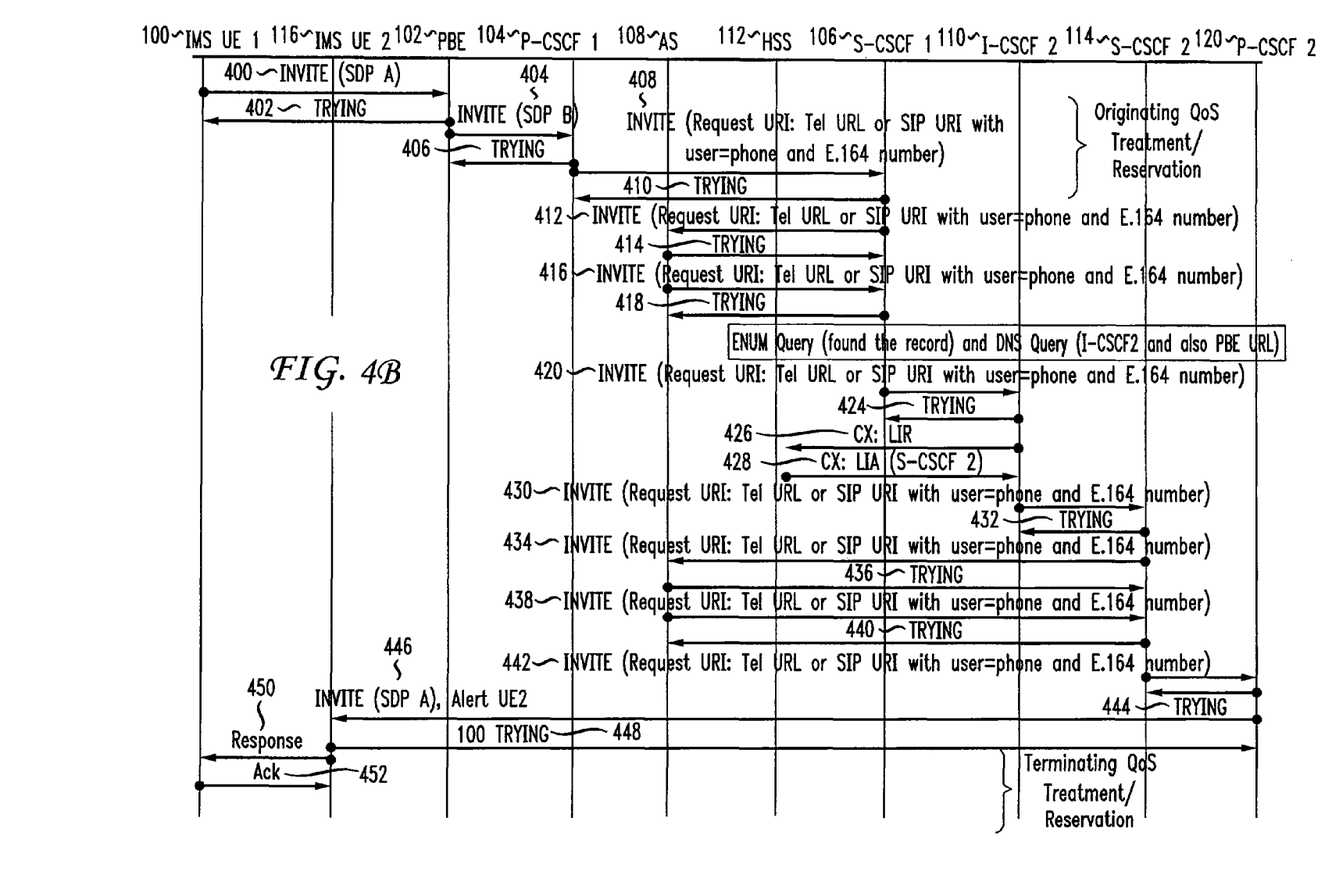
FIG. 4B shows a call flow diagram depicting the one round method for establishing an IP Multimedia Subsystem communication session of FIG. 4A.

FIG. 4B shows a signaling diagram depicting an implementation of one embodiment of the one round procedure shown in FIG. 4A according to one embodiment of the present invention. In response to a calling party requesting or attempting to initiate a communications session, IMS UE 1 transmits an SIP INVITE message 400 to PBE1 102. In one embodiment, SIP INVITE message 400 includes an SDP message (SDP A) which contains information such as the media content of the session and may also include other information such as what IP ports to use and information concerning codecs to be used. In one embodiment, SIP INVITE message 400 includes an SDP message containing additional information such as the media streams required for the communication session and the bandwidth requirement for the communication session. The SDP message, in one embodiment is an IETF RFC 2327 SDP message modified to include the additional information. In other embodiments, SIP message 400 does not contain an SDP message and information concerning the communication session is based on predetermined configuration information, which, in turn, is based on prior peering business agreements. Such predetermined configuration information may be stored in IMS UE1 and IMS UE2, an HSS, or an AS as described above.

In response to SIP INVITE message 400, PBE1 102 transmits informational response Trying message 402 to IMS UE 1 100 and transmits INVITE message 404 to P-CSCF 1 104. INVITE message 404, in one embodiment, also contains an SDP message (SDP B) including information originally transmitted from IMS UE 1 100.

In response to INVITE message 404, P-CSCF1 104 transmits INVITE message 408 to S-CSCF1 106 which responds with Trying message 410. INVITE message 408 includes Request URI: Tel URL or SIP URI with user=phone and E.164 number.

In response to INVITE message 408, S-CSCF1 106 transmits an INVITE message 412 to AS 108 which, in response transmits Trying message 414 to S-CSCF1 106. Also in response to INVITE message 412, AS 108 transmits INVITE message 416 to S-CSCF1 106. INVITE message 416 includes Request URI: Tel URL or SIP URI with user=phone and E.164 number.

In response to INVITE message 416, S-CSCF1 106 transmits Trying message 418 to AS 108. S-CSCF1 106 also transmits INVITE message 420, which includes a Request URI: Rel URL or SIP URI with user=phone and E.14 number, to I-CSCF2 110 which, in response, transmits Trying message 424 to S-CSCF1 106. In response to INVITE message 420, I-CSCF2 110 also transmits CX: LIR Message 426 to HSS 112. In response to CX: LIR message 426, HSS 112 transmits CX:LIA (S-CSCF 2) message 428 to I-CSCF2 110. In response to CX:LIA (S-CSCF2) message 428, I-CSCF2 transmits INVITE message 430, which includes Request URI: Tel URL or SIP URI with user=phone and E.164, to S-CSCF2 114 which, in response, transmits Trying message 432 to I-CSCF2 110. Also in response to INVITE message 430, S-CSCF2 114 transmits INVITE message 434 to AS 108, INVITE message 434 including a Request URI: Tel URL or SIP URI with user=phone and E.164 number. In response to INVITE message 434, AS 108 transmits Trying message 436 to S-CSCF2 110.

Also in response to INVITE message 434, AS 108 transmits INVITE message 438, which includes the Request URI: Tel URL or SIP URI with user=phone and E.164 number, to S-CSCF2 114. In response, S-CSCF2 114 transmits Trying message 440 to AS 108. Also in response to INVITE message 438, S-CSCF2 114 transmits INVITE message 442 to P-CSCF2 120, which, in response, transmits Trying message 444 to S-CSCF2 114. Also in response to INVITE message 442, P-CSCF2 120 transmits INVITE message 446 to IMS UE2 116. INVITE message 446 includes SDP A message which indicates resources required for the communication session as well as the media and codecs to be used. INVITE message 446 also contains an alert indicating that IMS UE1 100 is trying to establish a communication session with IMS UE2 116. In response to INVITE message 446, IMS UE2 116 transmits Trying message 448 to P-CSCF2 120.

If IMS UE2 116 is available, it will then examine the resource requirement identified in the SDP A message contained in INVITE message 446 and perform resource reservation (also referred to as resource allocation) to guarantee QoS for the IMS communication session. After the required resources are reserved, IMS UE2 116 sends response message 450 to IMS UE1 100 to confirm acceptance of the invitation to establish an IMS communication session. IMS UE1, in response to the received confirmation replies to IMS UE2 116 with an SIP ACK message 452 which completes the call signaling set up procedure.

If IMS UE2 116 is not available, IMS UE1 100 will receive an indication that IMS UE2 116 is not available. In one embodiment, IMS UE1 100 will be alerted to free up the advance QoS resource reservation. In one embodiment, the alert is transmitted from IMS UE2 116, in other embodiments, the alert to IMS UE1 to free up the advance QoS resource reservation may be transmitted by a different function or IMS UE1 100 may free up the resources after a period of time interpreted as an indication that IMS UE2 116 is not available.

It should be noted that an attempted communication session using the conventional two round procedure may fail if the called party and calling party do not support the same codec to be used for the communication session. The one round procedure described above will not fail due to the lack of a codec common to both the calling and called party because codec information is part of the predetermined configuration information and may be included in the peering business agreements between the called and calling parties.

Figure 5:
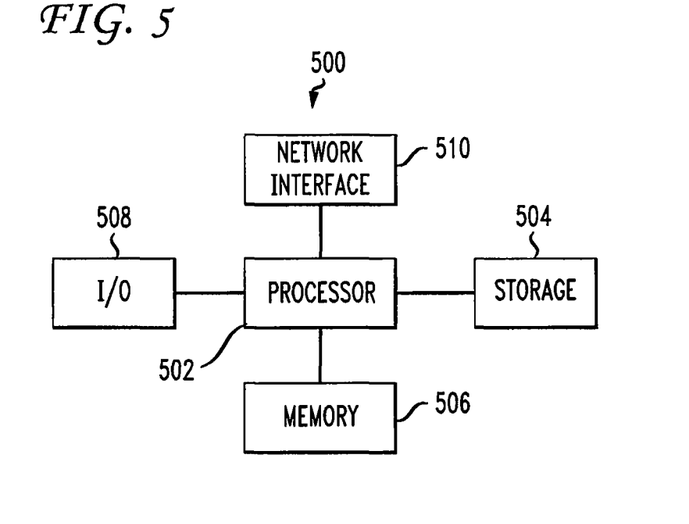
FIG. 5 shows high level block diagram of a computer that may be used to implement one or more functions shown in FIG. 1.

One or more of the functions described above and shown in FIG. 1 and the method described and shown in FIGS. 4A and 4B may be implemented on an implementer or node comprising a computer. A high-level block diagram of such a computer is illustrated in FIG. 5. Computer 500 contains a processor 502 which controls the overall operation of the computer 500 by executing computer program instructions which define such operation. The computer program instructions may be stored in a storage device 504, or other computer readable medium (e.g., magnetic disk, CD ROM, etc.), and loaded into memory 506 when execution of the computer program instructions is desired. Thus, the various operations performed by the functions of FIG. 1 can be defined by the computer program instructions stored in the memory 506 and/or storage 504 and controlled by the processor 502 executing the computer program instructions. For example, the computer program instructions can be implemented as computer executable code programmed by one skilled in the art to perform the signaling and operations shown in FIG. 4. Accordingly, by executing the computer program instructions, the processor 502 executes an algorithm defined by signaling and operations shown in FIG. 4. The computer 500 also includes one or more network interfaces 510 for communicating with other devices via a network. The computer 500 also includes input/output devices 508 that enable user interaction with the computer 500 (e.g., display, keyboard, mouse, speakers, buttons, etc.) One skilled in the art will recognize that an implementation of an actual computer could contain other components as well, and that FIG. 5 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for establishing an internet protocol multimedia subsystem communication session having a predetermined quality of service, the method comprising:
  receiving a request from user equipment associated with a calling party to establish an internet protocol multimedia subsystem communications session between the calling party and a called party;
  allocating resources for the internet protocol multimedia subsystem communication session based on predetermined configuration information related to the calling party and the called party, the predetermined configuration information based on a peering business agreement comprising information related to a codec and a medium the calling party and the called party support; and
  prohibiting the user equipment associated with the calling party from responding to messages from user equipment associated with the called party requesting a type of codec and media for use during the internet protocol multimedia subsystem communication session.

2. The method of claim 1 wherein the allocating resources is in response to receiving the request from the user equipment associated with the calling party.

3. The method of claim 1 further comprising receiving a response from the called party indicating that the called party accepts a request to establish the internet protocol multimedia subsystem communication session.

4. The method of claim 1 wherein the user equipment associated with the called party is configured to not expect a response from the user equipment associated with the calling party indicating the type of codec and media for use during the internet protocol multimedia subsystem communication session.

5. A method for establishing an internet protocol multimedia subsystem communication session having a predetermined quality of service, the method comprising:
  receiving a request to establish an internet protocol multimedia subsystem communication session between a calling party and a called party;
  allocating resources associated with a calling party network for the internet protocol multimedia subsystem communication session based on predetermined configuration information related to the calling party, the predetermined configuration information based on a peering business agreement comprising information related to a codec and a medium the calling party and the called party support; and
  prohibiting user equipment associated with the calling party from responding to messages from user equipment associated with the called party requesting a type of codec and media for use during the internet protocol multimedia subsystem communication session.

6. The method of claim 5 wherein the allocating resources is in response to receiving the request from the user equipment associated with the calling party.

7. The method of claim 5 further comprising receiving a response from the called party indicating that the called party accepts a request to establish the internet protocol multimedia subsystem communication session.

8. The method of claim 5 wherein the user equipment associated with the called party is configured to not expect a response from the user equipment associated with the calling party indicating a type of codec and media for use during the internet protocol multimedia subsystem communication session.

9. A method for establishing an internet protocol multimedia subsystem communication session having a predetermined quality of service, the method comprising:
  receiving a request from user equipment associated with a calling party to establish an internet protocol multimedia subsystem communication session between the calling party and a called party,
  allocating resources associated with a calling party network for the internet protocol multimedia subsystem communication session based on information contained in the request from the user equipment associated with the calling party, the information based on a peering business agreement comprising information related to a codec and a medium the calling party and the called party support;
  prohibiting the user equipment associated with the calling party from responding to messages from user equipment associated with the called party requesting a type of codec and media for use during the internet protocol multimedia subsystem communication session;
  forwarding the request from the user equipment associated with the calling party to the user equipment associated with the called party; and
  receiving a response from the user equipment associated with the called party.

10. The method of claim 9 wherein the allocating resources is in response to receiving the request from the user equipment associated with the calling party.

11. The method of claim 9 wherein the response from the user equipment associated with the called party indicates that the called party accepts a request to establish the internet protocol multimedia subsystem communication session.

12. The method of claim 9 wherein the user equipment associated with the called party is configured to not expect a response from the user equipment associated with the calling party indicating the type of codec and media for use during the internet protocol multimedia subsystem communication session.

* * * * *